(12) United States Patent
Boeck et al.

(10) Patent No.: US 9,216,490 B2
(45) Date of Patent: Dec. 22, 2015

(54) GUARD DEVICE

(71) Applicant: Robert Bosch GmbH, Stuttgart (DE)

(72) Inventors: Cornelius Boeck, Kirchheim (DE);
Joachim Schadow, Stuttgart (DE);
Tobias Overbeck, Moehringen (DE);
Rainer Vollmer, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 13/925,273

(22) Filed: Jun. 24, 2013

(65) Prior Publication Data

US 2013/0344780 A1 Dec. 26, 2013

(30) Foreign Application Priority Data

Jun. 25, 2012 (DE) .................. 10 2012 210 759

(51) Int. Cl.
  *B24B 23/02* (2006.01)
  *B24B 7/18* (2006.01)
  *B24B 55/05* (2006.01)
  *B23Q 11/08* (2006.01)

(52) U.S. Cl.
  CPC .............. *B24B 55/052* (2013.01); *B23Q 11/08* (2013.01); *B24B 7/18* (2013.01); *B24B 23/02* (2013.01)

(58) Field of Classification Search
  CPC ...... B24B 23/00; B24B 23/02; B24B 23/028; B24B 7/18; B24B 7/182; B24B 7/186; B24B 55/04; B24B 55/055; B23Q 11/08
  USPC .................. 451/344, 353, 359, 451
  See application file for complete search history.

(56) References Cited

U.S. PATENT DOCUMENTS

| | | | | |
|---|---|---|---|---|
| 4,060,940 A * | 12/1977 | DeWitt | ......................... | 451/358 |
| 4,574,532 A * | 3/1986 | Haberle et al. | ................ | 451/451 |
| 4,791,541 A * | 12/1988 | Simmons | ...................... | 362/376 |
| 4,924,635 A * | 5/1990 | Rudolf et al. | ................. | 451/344 |
| 5,005,321 A * | 4/1991 | Barth et al. | ................... | 451/359 |
| 5,074,044 A * | 12/1991 | Duncan et al. | .................. | 30/124 |
| 5,384,985 A * | 1/1995 | Jacobsson | ..................... | 451/344 |
| 5,440,815 A * | 8/1995 | Inkster | ............................ | 30/390 |
| 5,766,062 A * | 6/1998 | Edling | ........................... | 451/451 |
| 6,464,573 B1* | 10/2002 | Keller | ............................ | 451/451 |
| 6,669,544 B1* | 12/2003 | Walz et al. | .................... | 451/454 |
| 6,699,114 B1* | 3/2004 | Booeshaghi et al. | ......... | 451/451 |
| 6,893,334 B1* | 5/2005 | Stivers | .......................... | 451/359 |
| 6,949,017 B2* | 9/2005 | Koschel et al. | ............... | 451/358 |
| 6,988,939 B2* | 1/2006 | Hofmann et al. | ............. | 451/344 |
| 7,063,606 B2* | 6/2006 | Stierle et al. | .................. | 451/359 |
| 7,089,671 B2* | 8/2006 | Haneda et al. | ................. | 30/391 |

(Continued)

*Primary Examiner* — Eileen Morgan
(74) *Attorney, Agent, or Firm* — Maginot, Moore & Beck LLP (57) ABSTRACT

A guard device includes a fastening element defining a central opening and configured to be fastened onto a collar of a power tool, a guard portion extending from the fastening element and configured to surround at least a portion of a tool holder extending from the collar, a braking element pivotably supported on the fastening element and including a frictional engagement surface that is configured to be pivoted against the collar so as to apply a frictional braking force against the collar when the power tool is in an operating state, and an actuating element moveably supported on the fastening element and configured to pivot the braking element such that the frictional engagement surface is positioned in contact with the collar. The frictional engagement surface is configured to increase the braking force applied to the collar in response to a braking state of the power tool.

12 Claims, 7 Drawing Sheets

(56) References Cited

U.S. PATENT DOCUMENTS

| | | | |
|---|---|---|---|
| 7,311,589 B2 * | 12/2007 | Wiker | 451/451 |
| 2002/0157265 A1 * | 10/2002 | Haneda et al. | 30/391 |
| 2004/0014412 A1 * | 1/2004 | Hofmann et al. | 451/451 |
| 2006/0052041 A1 * | 3/2006 | Wiker | 451/451 |

* cited by examiner

GUARD DEVICE

This application claims priority under 35 U.S.C. §119 to patent application no. DE 10 2012 210 759.2, filed on Jun. 25, 2012 in Germany, the disclosure of which is incorporated herein by reference in its entirety.

BACKGROUND

Guard devices for power tools are already known.

SUMMARY

The disclosure is based on a guard device for a power tool comprising a fastening element defining a central opening through which a collar of the power tool is extended, the fastening element being configured to be fastened onto the collar, a guard portion extending from the fastening element and configured to surround at least a portion of a tool holder extending from the collar of the power tool when the collar is extended through the central opening of the fastening element, a braking element supported on the fastening element and including a frictional engagement surface that is configured to be displaced against the collar so as to apply a frictional braking force against the collar, and an actuating element moveably supported on the fastening element and configured to pivot the braking element such that the frictional engagement surface is positioned in contact with the collar. The frictional engagement surface is configured to increase the braking force applied to the collar in response to a braking state of the power tool.

It is proposed that the at least one actuating unit comprises at least one lever element. The basic element preferably forms a guard, which is configured for fastening to a portable power tool, in particular to a right angle grinder. The fastening element is preferably configured to fasten the guard device in a fitted state, in an at least partially stable manner, to the portable power tool. The fastening element is preferably formed by a band clamp. By a "braking element" should in this context be understood, in particular, an element which is configured to, in particular in a fitted state, apply a braking force to a further, corresponding element. Preferably, the braking force, in particular in an operating state of a force which in an operating state acts on the guard device, in particular on the basic element, is at least partially, preferably fully, oppositely directed. The braking force is preferably at least partially formed by a friction force. It is also conceivable, however, for the braking force to be formed, at least partially, by a form closure. It is further conceivable for the braking element to be configured to fulfill further functions and/or tasks which appear sensible to a person skilled in the art, such as, for example, a loss prevention of the guard device on a portable power tool, in particular in the axial direction, and/or a coding.

By an "operating state" should in this context particularly be understood, by an operator, a controlled and normal working and/or usage state of the portable power tool to which the guard device is coupled. By a "lever element" should in this context be understood, in particular, an element which is provided, in particular, to translate and/or transmit at least one active force by means of at least one pivot motion about at least one pivot point. A preferably robust, inexpensive and reliable embodiment of the actuating unit can thereby be achieved.

It is further proposed that the guard anti-twist device comprises at least one bearing unit, which is configured to support the at least one lever element in an at least partially pivotable manner. By a "bearing unit" should in this context be understood, in particular, a unit which is configured to absorb forces of at least one mounted element. The bearing unit is preferably configured to movably support at least one mounted element. The bearing unit can comprise a roller bearing and/or slide bearing element. A preferably simple embodiment of the actuating unit can thereby be achieved.

In addition, it is proposed that the at least one lever element is configured to act, at least in the radial direction, on the at least one braking element. A preferably high braking force of the braking element in a braking state can thereby be achieved.

It is further proposed that the at least one lever element is configured to at least partially directly contact the at least one braking element. By "directly contact" should in this context be understood, in particular, that at least one lever element is configured to at least partially touch the at least one braking element in a fitted state in order to transmit at least one force to the at least one braking element. An advantageously reliable and component-saving embodiment of the guard device can thereby be achieved.

It is proposed that the at least one bearing unit is connected at least partially fixedly to the fastening element. It is also conceivable for the bearing unit to be configured such that it is at least partially integrally connected to the fastening element. By "integrally connected" should be understood, in particular, that the mass parts are held together by atomic or molecular forces, such as, for example, in the soldering, welding, gluing and/or vulcanization operations. A constructionally simple and advantageously compact, as well as lossproof embodiment of the bearing unit can thereby be achieved.

It is additionally proposed that the at least one braking element comprises at least one eccentric. By an "eccentric" should in this context be understood, in particular, an element which is configured to, when rotated about a rotational axis, create on an outer surface facing away from the rotational axis a force upon a third element, wherein a distance between the rotational axis and the outer surface in a peripheral direction is configured at least partially unevenly. A constructively simple, robust and inexpensive embodiment of the braking element can thereby be achieved.

In addition, it is proposed that the at least one braking element and the at least one lever element are configured at least partially in one piece.

By "in one piece" should be understood, in particular, at least integrally connected, for example by a welding process, a gluing process, an spray-on process and/or another process which appears sensible to a person skilled in the art, and/or advantageously formed in one piece, such as, for example, by manufacture from a casting and/or by manufacture in a single or multicomponent spraying process and advantageously from a single blank. A constructively simple and advantageously compact embodiment of the guard device can thereby be achieved.

It is further proposed that the guard anti-twist device comprises at least one bearing unit, which is configured to support the braking element, at least in a braking state, movably relative to the basic element. By a "bearing unit" should in this context be understood, in particular, a unit which is configured to absorb forces of at least one mounted element. The bearing unit is preferably configured to movably support at least one mounted element. The bearing unit can comprise a roller bearing and/or slide bearing element. By "movably relative to the basic element" should be understood in this context, in particular, that the braking element can execute at least one motion in which a position of the braking element relative to the basic element changes. By a "braking state" should in this context be understood, in particular, an extraordinary and uncontrolled operating state of the portable power tool to which the guard device is coupled. A braking state can be induced, in particular, by the rupturing of an insert tool, connected to the portable power tool, in an operating state. A preferably secure anti-twist locking of the guard device on a portable power tool, as well as an advantageously high operator safety, can thereby be achieved.

It is further proposed that the bearing unit is configured to support the at least one braking element such that this is tiltable about at least one axis. By "tiltable" should in this context be understood, in particular, pivotable about at least one axis through a specific angular range.

It is also conceivable for the bearing unit to be configured to fulfill at least one further function and/or task which appears sensible to a person skilled in the art. In a constructively simple manner, a preferably reliable and secure anti-twist locking of the guard device, and thus an advantageously high operator safety, can thereby be achieved.

Further advantages emerge from the following drawing description. In the drawing, a plurality of illustrative embodiments of the disclosure are represented. The drawing and the description contain numerous features in combination. The person skilled in the art will expediently consider the features also individually and will combine these into sensible further combinations.

DETAILED DESCRIPTION

Figure 1A:
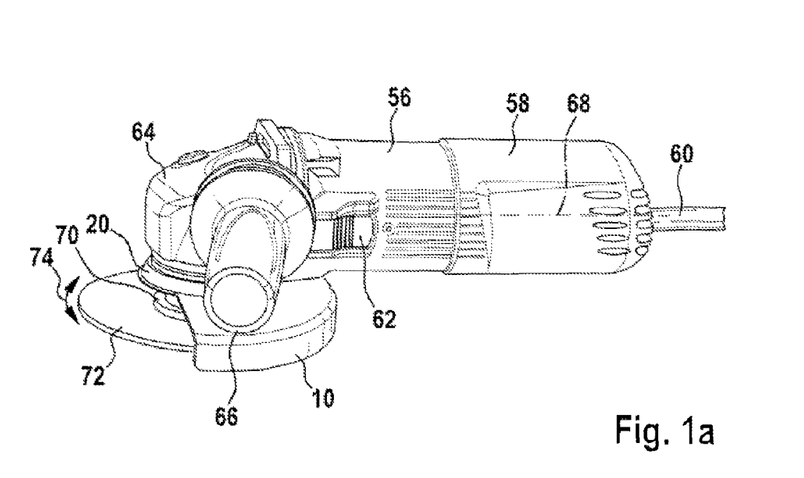
FIG. 1a shows a portable power tool having an illustrative guard device in a perspective representation.

In FIG. 1a, a portable power tool formed by a right angle grinder is represented. The portable power tool has a housing 56. The housing 56 is of cylindrical configuration and serves as a handle 58 for an operator. The housing 56 encloses a drive unit (not represented) formed by an electric motor. The housing 56 is formed of a plastic. At one end of the housing 56, the portable power tool has a power cable 60, which is configured to supply the drive unit with electric power. At an end of the housing 56 which is facing away from the drive unit, an actuating element 62 is disposed on the housing 56. The actuating element 62 is formed by a slide switch and is configured to actuate, i.e. switch on and off, the drive unit.

Adjoining that end of the housing 56 which is facing away from the drive unit is a gear casing 64. The gear casing 64 encloses a gear unit (not represented). The gear casing 64 is fixedly connected to the housing 56. The gear casing 64 is screwed to the housing 56. The gear casing 64 is formed of a metal. In a region in which the housing 56 and the gear casing 64 are connected to each other, an additional handle 66 is arranged. The additional handle 66 extends perpendicularly to a drive output axis 68 of the drive unit.

Projecting from the gear casing 64, perpendicularly to the drive output axis 68 of the drive unit and perpendicularly to the additional handle 66, is a tool holder 70. The tool holder 70 is configured to receive an insert tool 72 and drive it in an operating state. The tool holder 70 is connected to a power take-off shaft 86. The power take-off shaft 86 is enclosed in the peripheral direction 74 by a collar 20.

Figure 1B:
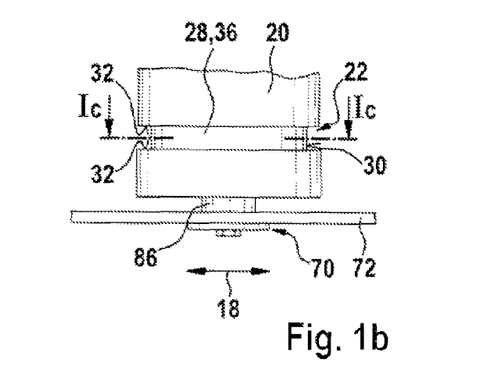
FIG. 1b shows a detail of the portable machine tool in the region of a collar in a schematic, perspective representation.
Figure 1C:
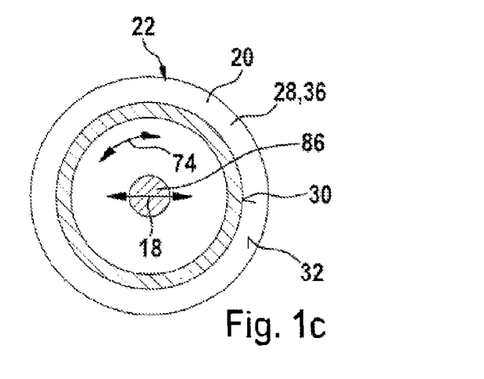
FIG. 1c shows the collar of the portable power tool in a schematic sectional representation.

In FIGS. 1b and 1c, the collar 20 of the portable power tool is shown in detailed representation. The collar 20 of the portable power tool is configured to receive a guard device. The insert tool 72 is formed by a grinding or cutting-off wheel. In a fitted state, the guard device extends around the tool holder 70. The collar 20 is disposed between the tool holder 70 and the gear casing 64. The collar 20 comprises a braking region 22, in which a braking groove 28 is disposed. The braking groove 28 extends from the outer peripheral surface of the collar 20 inward in the radial direction 18. The guard device is fastened in a fitted state in the braking region 22 of the collar 20. In a fitted state, a braking element 114 of the guard anti-twist device 112 engages in the braking groove 28. The braking groove 28 comprises a groove bottom 30, and two groove walls 32 extending perpendicular thereto.

Figure 2A:
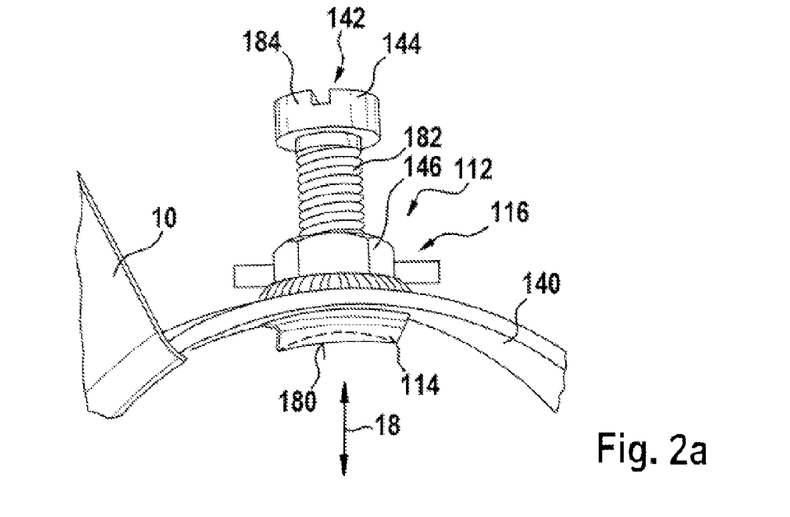
FIG. 2a shows a detail of the disclosed guard device having a guard anti-twist device in a schematic representation.

The guard device comprises a fastening element 140 formed by a clamping band that defines a central opening configured to receive the collar 20 of the portable power tool, a basic element 110 extending from the fastening element and configured to enclose the insert tool 72 when the guard device is connected to the tool holder 70, within an angular range of about 180°, and a guard anti-twist device 112 (FIG. 2a). The guard device can be fastened by the fastening element 140 to the collar 20 of the portable power tool steplessly in an angular position desired by an operator. In one embodiment, the basic element 110 is fixedly connected to the fastening element 140. In another embodiment, the basic element 110 is integrally connected to the fastening element 140. In one particular embodiment, the basic element 110 is welded to the fastening element 140. In a fitted state, the fastening element 140 bears against the collar 20 of the portable power tool and encloses the same.

Figure 2B:
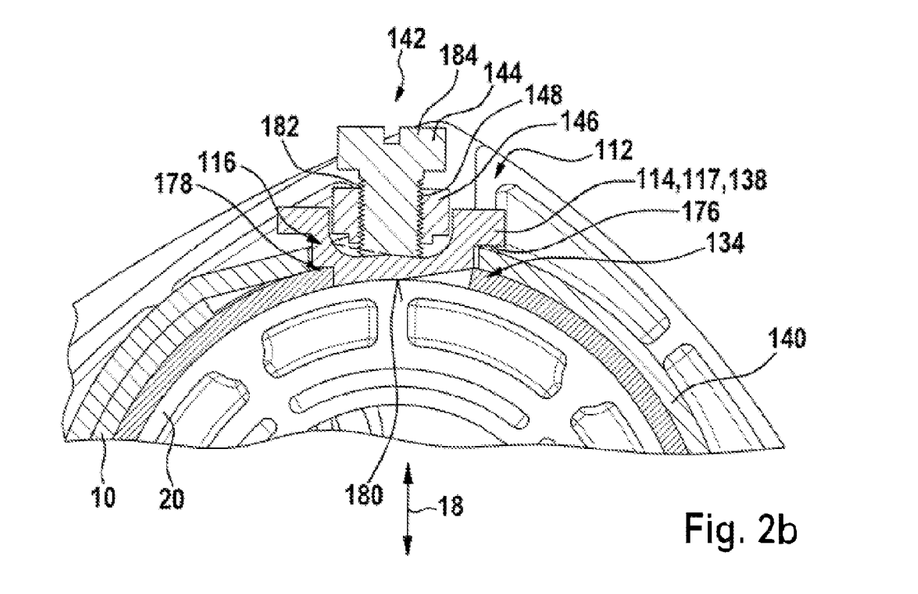
FIG. 2b shows the detail of the disclosed guard device having a guard anti-twist device in a sectional representation.

In FIGS. 2a and 2b is a first illustrative embodiment of the guard anti-twist device 112. In order to be able to securely prevent unwanted twisting of the basic element 110 relative to the tool holder 70, particularly if the insert tool 72, in an operating state, were to rupture, the guard anti-twist device 112 has a braking element 114. The braking element 114 of the guard anti-twist device 112 is, in an operating state of the portable power tool, configured for frictional anti-twist locking of the basic element 110 relative to the portable power tool. The braking element 114 is formed by a sliding block. The braking element 114 is formed of a metal.

The guard anti-twist device 112 further comprises a bearing unit 116, which is configured to support the braking element 114, in an operating state of the portable power tool, movably relative to the basic element 110. The bearing unit 116 comprises a cutout 176, which extends in the radial direction 18 through the fastening element 140. The braking element 114 extends in a fitted state through the cutout 176 in the fastening element 140. The braking element 114 is movably mounted. The bearing unit 116 is configured to support the braking element 114 tiltably about an axis. The axis extends perpendicularly to the radial direction 18. In addition, the bearing unit 116 is configured to support the braking element 114 tiltably about a further axis. The further axis extends parallelly to the radial direction 18.

The braking element 114 has a pot-shaped cross section. An outer contour of the braking element 114, which outer contour faces inward in the radial direction 18, has a step-shaped region 178. On a side facing away from the step-shaped region 178, the inward facing outer contour of the braking element 114 has a beveled corner. The braking element 114 is configured such that it is laterally open between the step-shaped region 178 and the corner. The braking element 114 is mounted with play in the cutout 176 of the fastening element 140 of the guard device. The braking element 114 is mounted such that it is displaceable and tiltable within the cutout 176 in the peripheral direction 74 and in the radial direction 18. The braking element 114 has a frictional engagement surface 180, which extends parallelly to the peripheral direction 74. The frictional engagement surface 180 is of curved configuration. The frictional engagement surface 180 is configured to, in a fitted state, form a frictional engagement between the braking element 114 and a groove of the collar 20. Alternatively, it is also conceivable for the braking element 114 to act on an outer peripheral surface of the collar 20 and, in a braking state, form a frictional engagement therewith.

A center point of this curved frictional engagement surface 180 here lies offset to a center point of the collar 20. The center point of the curved frictional engagement surface 180 is arranged displaced in at least one direction, preferably in two directions, in relation to the center point of the collar 20. If the center point of the curved frictional engagement surface 180 of the braking element 114 is placed in an X-Y system of coordinates, with the braking element 114 lying on a negative Y-axis, then this center point is negatively displaced in the X direction and in the Y direction. In connection with the mounted installation position, this shaping is of particular importance and has great influence on a delay in angular momentum in respect of a basic element 110 of the guard device in a braking state, which basic element has been abruptly set in rotation. The shaping of the curved frictional engagement surface 180 of the braking element 114 further causes the guard device to be strongly fixed to the collar 20 in the working position. In additional, a diameter of the curved frictional engagement surface 180 of the braking element 114 is smaller than a diameter of the collar 20, whereby a twisting of the basic element 110 relative to the portable power tool can be prevented and an angular momentum delay in a braking situation can be improved. It is also conceivable, however, for the frictional engagement surface 180 of the braking element 114, as shown in dashed representation in FIG. 2a, to have a significantly stronger curvature than the collar, whereby, in a fitted state, a linear contact of one edge of the braking element 114 against the collar and thus, in a braking state, an advantageous entrenchment of the edge of the braking element 114 into the groove bottom 30 can be achieved.

In a braking state, which can arise as a result of rupturing of the insert tool 72 during an operating state of the portable power tool, large forces act on the basic element 110 of the guard device as a result of flying splinters of the insert tool 72. These large forces can induce twisting of the basic element 110 relative to the portable power tool. In order to prevent, or at least reduce, this twisting of the basic element 110 relative to the portable power tool in the braking state, the guard device has a self-energizing unit 134, which is configured to increase a braking force between the collar 20 of the portable power tool and the braking element 114 in a braking state. The braking state is brought about by twisting of the guard device, in a state fitted to the collar 20, relative to the portable power tool. The self-energizing unit 134 comprises the braking element 114. A contour of the braking element 114, which forms the frictional engagement surface 180, is configured to increase the braking force between the collar 20 of the portable power tool and the braking element 114 in a braking state. Moreover, a position of the axis about which the braking element is tiltably mounted impacts on the increase in braking force of the braking element 114 in a braking state by the self-energizing unit 134. The bearing unit 116 and the self-energizing unit 134 are thus configured partially in one piece.

The guard anti-twist device 112 comprises an actuating unit 142 moveably supported on the fastening element 140, which is configured to directly contact the braking element 114 and displace the braking element 114 in a clamping operation for fastening of the guard device to the portable power tool. The actuating unit 142 includes a screwing element 144 embodied as a screw with an external thread 182. The screwing element 144 is configured to act on the braking element 114 in the radial direction 18. The screwing element 144 has a screw head 184 having an actuating contour configured to be turned with a screwdriver by an operator in order to tighten the screwing element 144 in order to displace the braking element 114.

The actuating unit 142 further includes a receiving element 146, which is configured to correspond with the screwing element 144. The receiving element 146 is likewise formed by a screw element. The receiving element 146 comprises an internal thread 148. The receiving element is formed by a screw nut. The external thread 182 of the screwing element 144 and the internal thread 148 of the receiving element 146 are of mutually corresponding configuration. The screwing element 144 and the receiving element 146 are configured to be screwed together. The receiving element 146 is fixedly connected to the fastening element 140. The receiving element 146 is integrally connected to the fastening element 140. The receiving element 146 is welded to the fastening element 140. The receiving element 146 is welded to the outside of the fastening element 140 in the radial direction 18.

The screwing element 144 is, in a fitted state, screwed into the receiving element 146 and extends parallelly to the radial direction 18 through the receiving element 146. In a fitted state, the screw head 184 forms an outermost point of the screwing element 144, viewed in the radial direction 18. An end of the screwing element 144, which end faces away from the screw head 184, bears against a surface of the braking element 114 which runs parallelly to the frictional engagement surface 180 (FIG. 2b). Turning of the screwing element 144 is translated by the internal thread 148 of the receiving element 146 into a linear motion of the screwing element 144 in the radial direction 18. The braking element 114 is thereby displaced inward in the radial direction 18 and presses in a fitted state against the collar 20 of the portable power tool. An abutment shoulder 117 of the braking element 114 bears against the fastening element 140. Further screwing in of the screwing element 144 causes the braking element 114 to tilt about an outer edge of the abutment shoulder 117, whereby an opposite edge of the frictional engagement surface 180 is pressed against the braking groove 128.

Alternatively or additionally, a surface which lies opposite the frictional engagement surface 180 and against which the screwing element 144, in a fitted state of the guard device, rests, can be configured obliquely to the peripheral direction 74, whereby a tilting of the braking element 114 as the screwing element 144 is screwed in can advantageously be reinforced.

It is also conceivable, however, for the screwing element 144 to be configured for screwing directly into a recess (not represented) of the fastening element, which recess can have an internal thread, whereby the receiving element as a separate component can advantageously be dispensed with.

When the screwing element 144 is screwed in, a first edge of the braking element 114 first of all touches the groove bottom 30 of the braking groove 28. Upon further screwing in, a force in the radial direction 18 increases, which force acts via the screwing element 144 on the braking element 114, and the braking element 144 tilts about an axis running perpendicularly to the radial direction 18. The axis corresponds to the first edge of the braking element 114. The braking element 114 tilts to the point where a further edge of the braking element 114 likewise bears against the groove bottom 30 of the braking groove 28 of the collar 20. This tilting characteristic is of particular importance especially in the case of a basic element 110 of the guard device which is abruptly set in rotation relative to the portable power tool, and is comparable to the effect of a primary brake. In a braking state, the braking element 114 tends to come to bear against the collar 20. Self-energization of the braking force, configured as friction force, of the braking element 114 in a braking state is thereby obtained. As a result of the herein formed frictional engagement between the braking element 114 and the collar 20, unwanted twisting of the basic element 110 relative to the portable power tool in an operating state is prevented.

The guard device further comprises a coding element 138, which is configured to correspond with a coding element 36 of the collar 20 of the portable power tool (FIGS. 1b and 1c). The coding element 36 of the collar 20 is formed by the braking groove 28 which is made in the collar 20. The coding element 138 of the guard device is configured in one piece with the braking element 114. The coding element 36 of the collar 20 is configured in one piece with the braking groove 28. It is also conceivable, however, for the coding element 136 of the collar 20 to be configured separately from the braking groove 28 and/or for the coding element 138 of the guard device to be configured separately from the braking element 114. The guard device is configured for the portable power tool.

A further guard device (not represented) is configured for a further portable power tool (not represented). The further portable power tool is configured similarly to the portable power tool already described. The further portable power tool is likewise formed by a right-angle grinder. The further portable power tool has less power and is configured smaller than the portable power tool already described. The further guard device corresponds in its function to the guard device already described. The further guard device likewise has a coding element formed by a braking element. The coding element of the further guard device is configured larger than the coding element 138 of the guard device already described. The further portable power tool has a collar having a braking region in which a braking groove is disposed. The braking element of the further guard device is configured to, in a fitted state, engage in the braking groove. The braking groove of the collar of the portable power tool is configured larger than the braking groove 28 of the collar 20 of the portable power tool already described. The coding element, formed by the braking element, of the further guard device cannot therefore correspond with the coding element 36, formed by the braking groove 28, of the portable power tool and engage in the braking groove 28. The coding element of the further guard device locks with the coding element 36 of the portable power tool. A fitting of the further guard device to the portable power tool for which the further guard device is not configured can thus be prevented. By contrast, the guard device can be fitted to the further portable power tool, since the guard device is overdimensioned in configuration, yet, in an operating or braking state, represents no danger for an operator of the further portable power tool.

The following descriptions and the drawings of the further illustrative embodiments are substantially restricted to the differences between the illustrative embodiments, wherein, in relation to like-denoted components, in particular in relation to components with same reference symbols, reference can also fundamentally be made to the drawings and/or the description of the other illustrative embodiments. In order to differentiate between the illustrative embodiments, the numerals 1 to 9 are prefixed to the relevant reference symbols of the further illustrative embodiments.

Figure 3A:
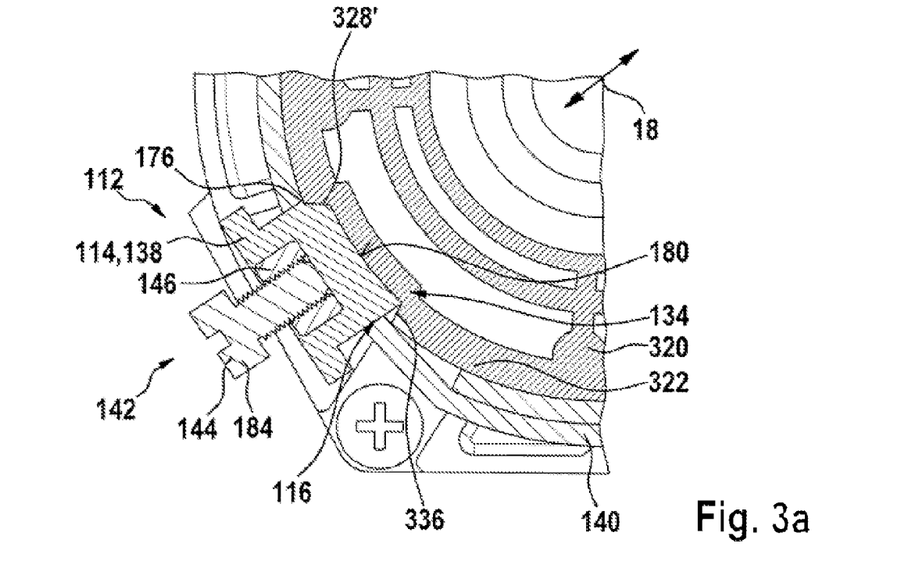
FIG. 3a shows a detail of an alternative guard device having a guard anti-twist device in a schematic sectional representation.
Figure 3B:
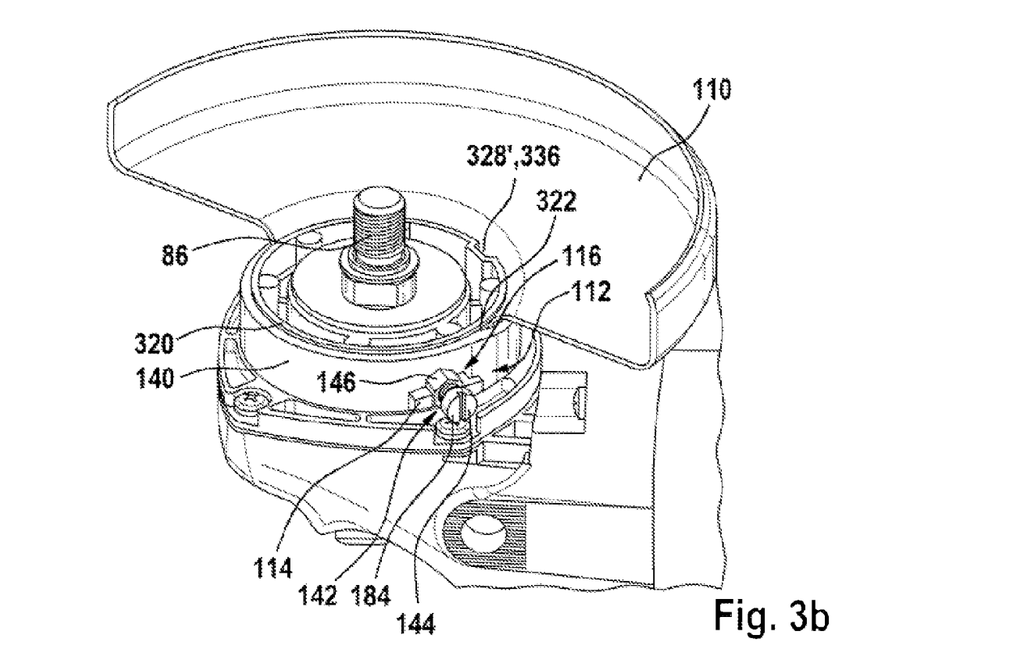
FIG. 3b shows the detail of the alternative guard device having the guard anti-twist device in a state fitted to the portable power tool.

In FIGS. 3a and 3b, a guard device is represented. The alternative guard device corresponds to the guard device already described and is configured for coupling to an alternatively configured collar 320 of the portable power tool already described. The collar 320 has on an outer peripheral surface a braking region 322. In the braking region 322 of the collar 320 is disposed a braking groove 328'. The braking groove 328' extends from the outer peripheral surface of the collar 320 inward in the radial direction 18. The braking groove 328' is formed by a vertical groove, which extends parallelly to the power take-off shaft 86 of the portable power tool. In the course of mounting of the guard device, the braking element 114 is guided in the braking groove 328' in the axial direction. The braking groove 328' forms a coding element 336, which is configured to correspond with the coding element 138 formed by the braking element 114. In addition, a braking groove 328 (not represented in detail), which extends in the peripheral direction 74 along the collar 320 and overlaps with the braking groove 328' (FIGS. 1b and 1c), is provided.

Figure 4A:
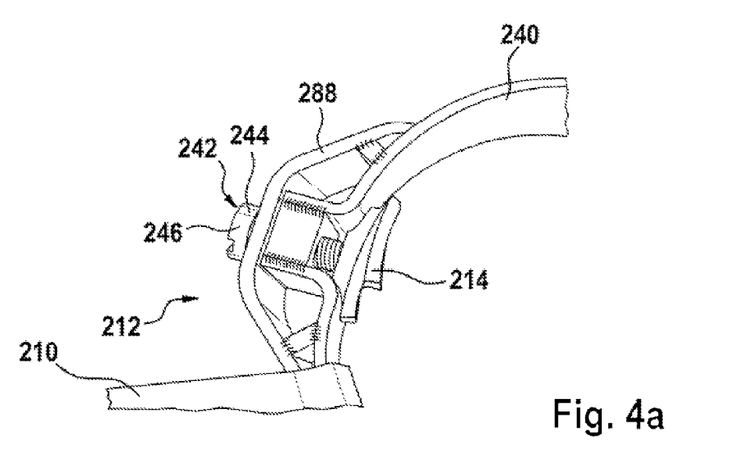
FIG. 4a shows a detail of an alternative guard device having a guard anti-twist device in a schematic representation.
Figure 4B:
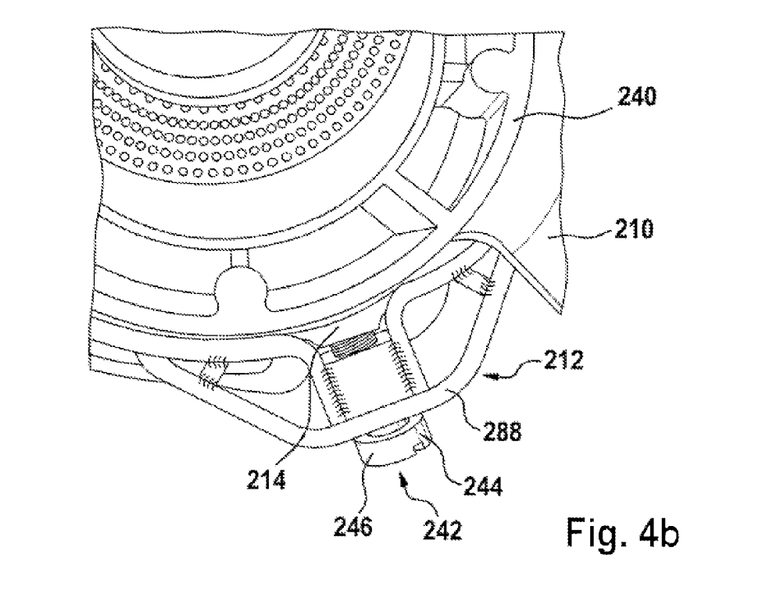
FIG. 4b shows the alternative guard device in a state fitted to the portable power tool in a perspective representation.

In FIGS. 4a and 4b, a detail of an alternative guard device is represented. The alternative guard device corresponds in large part to the guard device already described and is configured for coupling to the portable power tool already described. The alternative guard device comprises a fastening element 240 that defines a central opening configured to receive the collar of the portable power tool, a basic element 210 extending from the fastening element 240 and configured to enclose the insert tool when the guard is connected to the tool holder, and a guard anti-twist device 212. The guard anti-twist device 212 has a braking element 214, which, in an operating state of the portable power tool, is configured for frictional anti-twist locking of the basic element 210 relative to the portable power tool. The guard anti-twist device 212 additionally has an actuating unit 242 comprising a screwing element 244 moveably supported on the fastening element 240 and is configured to displace the braking element 214 into engagement with the collar of the power tool. The screwing element 244 corresponds to the screwing element 144 already described. The actuating unit 242 further comprises a receiving element 246, which is configured to correspond with the screw element 244. The receiving element 246 is likewise formed by a screw element. The receiving element 246 corresponds to the receiving element 146 already described.

The actuating unit 242 further has a reinforcing element 288, which is configured to reinforce and stabilize the actuating unit 242.

The reinforcing element 288 is formed by an arcuate sheet metal element. The reinforcing element 288 is fixedly and integrally connected to the fastening element 240. The reinforcing element 288 is welded onto the fastening element 240. The reinforcing element 288 extends over the receiving element 246. In a fitted state, the screwing element 244 rests with a screw head 284 partially against the reinforcing element 288. Alternatively or additionally, the reinforcing element 288 can be configured to serve in a braking state as a stop against the gear casing 64 of the portable power tool and thus form a further, positive anti-twist locking mechanism of the guard device.

Figure 5:
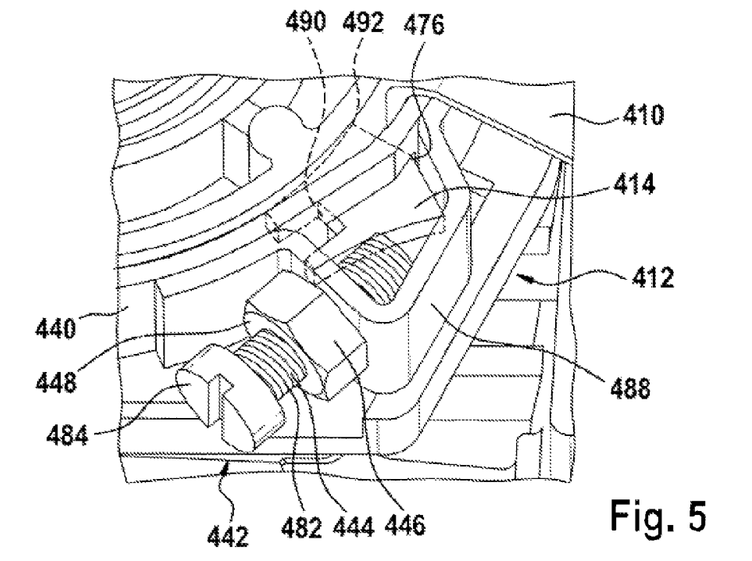
FIG. 5 shows a detail of an alternative guard device having a guard anti-twist device in a schematic representation.

In FIG. 5, an alternative guard device is represented. The alternative guard device corresponds in large part to the guard device already described and is configured for coupling to the portable power tool already described. The alternative guard device comprises a fastening element 440 that defines a central opening configured to receive the collar of the portable power tool, a basic element 410 extending from the fastening element and configured to enclose the insert tool when the guard device is connected to the tool holder of the power tool, and a guard anti-twist device 412. The guard anti-twist device 412 comprises a braking element 414, and an actuating unit 442 configured to displace the braking element 414 in the radial direction 18. In the embodiment shown, the braking element 414 has a polygonal base. In one particular embodiment, the braking element 414 has a pentagonal, mirror-symmetrical base. The base is interrupted by rectangular incision 490, which is made in mirror-symmetrical arrangement in the base. The incision 490 is configured to, in the peripheral direction 74, engage in a recess 476 of the fastening element 440, which recess forms a bearing unit 416, and to guide the braking element 414 tangentially to the fastening element 440. An axis of mirror symmetry of the base of the braking element 414 is arranged tangentially to the fastening element 440.

The actuating unit 442 comprises a screwing element 444, which extends tangentially to the fastening element 440. The screwing element 444 has an external thread 482. The screwing element 444 is formed by a screw. Attached to the fastening element 440 is a reinforcing element 488. The reinforcing element 488 is welded onto the fastening element 440. The reinforcing element 488 is formed of a metal sheet. On the reinforcing element 488 is disposed a receiving element 446. The receiving element 446 has an internal thread 448. The internal thread 448 of the receiving element 446 corresponds to the external thread 482 of the screwing element 444. The receiving element 446 is formed by a screw nut. The receiving element 446 is welded onto the reinforcing element 488. Alternatively or additionally, the reinforcing element 488 can be configured to serve in a braking state as a stop against the gear casing 64 of the portable power tool and thus to form a further, positive anti-twist locking mechanism of the guard device.

If the screwing element 444 is screwed into the receiving element 446, an end of the screwing element 444, which end lies opposite a screw head 484, is displaced tangentially to the fastening element 440 along an ascending side face 492 of the braking element 414. The braking element 414 is thereby displaced tangentially to the peripheral direction 74 in the same direction as the screw element 444 and inward in the radial direction 18. A radially outer edge of the ascending side face 492 of the braking element 214 here slides along a descending face of the reinforcing element 488, whereby the braking element 414 is likewise displaced inward in the radial direction 18. An edge 492 of the braking element 414, which edge lies innermost in the radial direction 18, is here pressed against the collar 20 of the portable power tool already described and thus forms a frictional anti-twist locking mechanism. The braking element 414 is, in a braking state, tiltably mounted.

Figure 6:
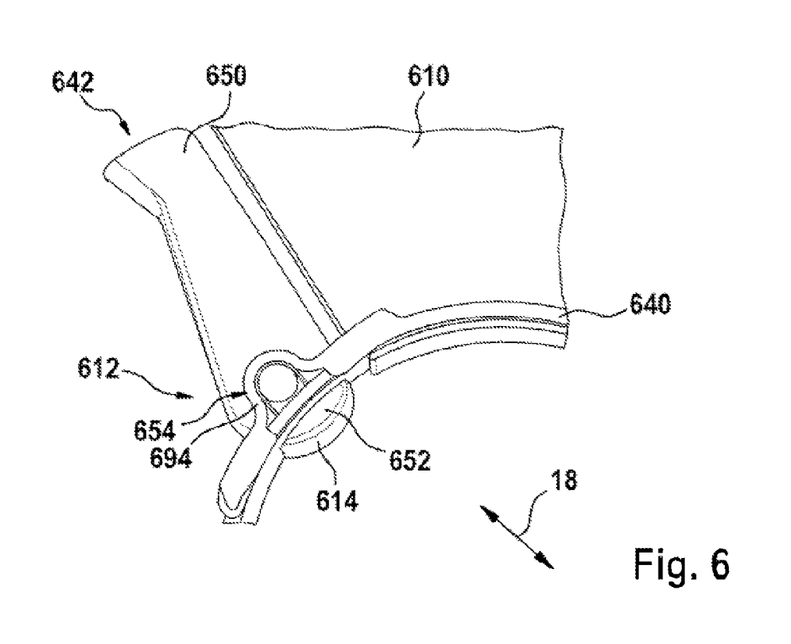
FIG. 6 shows a detail of an alternative guard device having a guard anti-twist device in a schematic representation.

In FIG. 6, a detail of an alternative guard device is represented. The alternative guard device corresponds in large part to the guard device already described and is configured for coupling to the portable power tool already described. The alternative guard device comprises, a fastening element 640 that defines a central opening configured to receive the collar of the portable power tool, a basic element 610 extending from the fastening element and configured to enclose the insert tool when the guard device is connected to the tool holder of the power tool, and a guard anti-twist device 612. The guard anti-twist device 612 has a braking element 614 pivotably supported on the fastening element 640, which, in an operating state of the portable power tool, is configured for frictional anti-twist locking of the basic element 610 relative to the portable power tool. The guard anti-twist device 612 additionally has an actuating unit 642 moveably supported on the fastening element and configured to displace the braking element 614 into engagement with a collar of a power tool.

In the embodiment shown, the actuating unit 642 comprises a lever element 650. The guard anti-twist device 612 comprises a bearing unit 654, which is configured to pivotably support the lever element 650, and further configured to support the braking element 614, in a braking state, movably relative to the braking element 640. In the embodiment shown, the braking element 614 comprises an eccentric 652. The lever element 650 is configured to directly contact the braking element 614 to act on the braking element 614 in the radial direction 18. In the embodiment shown, the lever element 650 and the braking element 614 are fixedly connected to each other. In one embodiment, the lever element 650 and the braking element 614 are integrally connected to each other. In one particular embodiment, the lever element 650 and the braking element 614 are configured in one piece.

The bearing unit 654 comprises a bearing pin, which forms a pivot axis about which the lever element 650 and the braking element 614 are configured to pivot. The bearing pin is connected in a rotationally secure manner to the lever element 650, is held by a bearing element 694, and is mounted rotatably relative to the fastening element 640 of the guard device. In one embodiment, the bearing element 694 is formed by a sheet metal element, which is fixedly connected to the fastening element 640 and forms an eyelet. In one embodiment, the bearing element 694 is welded to the fastening element 640. The bearing pin engages in the eyelet formed by the bearing element 694. The lever element 650 may be pivoted to pivot the braking element 614 such that the braking element engages a collar of a power tool so that the braking element 614 applies a frictional braking force against the collar when the power tool is in an operating state.

Figure 7:
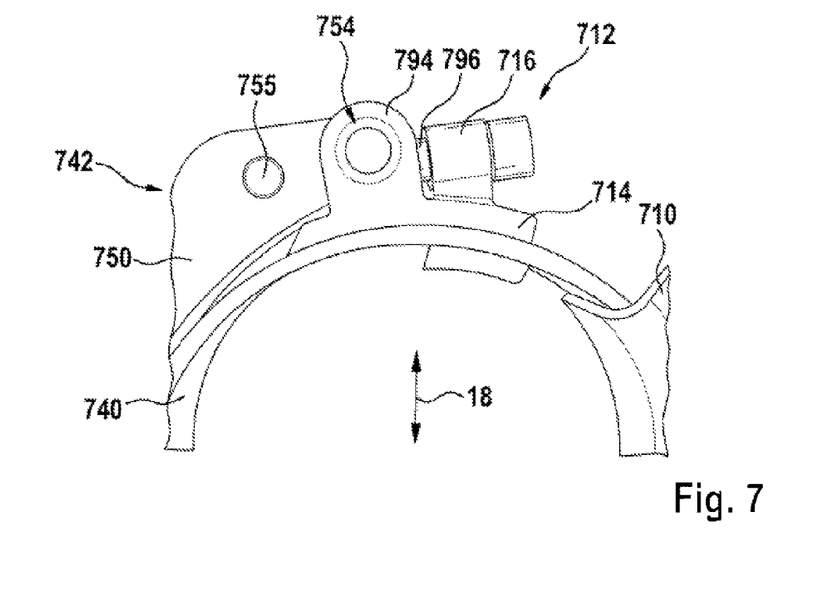
FIG. 7 shows a detail of an alternative guard device having a guard anti-twist device in a schematic representation.

In FIG. 7, a detail of an alternative guard device is represented. The alternative guard device corresponds in large part to the guard device already described and is configured for coupling to the portable power tool already described. The alternative guard device comprises a fastening element 740 that defines a central opening configured to receive the collar of the portable power tool, a basic element 710 extending from the fastening element and configured to enclose the insert tool when the guard device is connected to the tool holder of the power tool, and a guard anti-twist device 712. The guard anti-twist device 712 has a braking element 714 pivotably supported on the fastening element 740, which, in an operating state of the portable power tool, is configured to engage the surface of the collar of the power tool and provide for frictional anti-twist locking of the basic element 710 relative to the portable power tool. The guard anti-twist device 712 additionally has an actuating unit 742 moveably supported on the fastening element 740 and configured to displace the braking element 714 into engagement with the collar of the power tool.

In the embodiment shown, the actuating unit 742 comprises a lever element 750. The guard anti-twist device 712 comprises a bearing unit 754, which is configured to support the lever element 750. The bearing unit 754 includes a bearing pin, which extends perpendicularly to the radial direction 18. The bearing pin is connected in a rotationally secure manner to the lever element 750. The bearing pin is held by a bearing element 794 and is mounted rotatably relative to the fastening element 740 of the guard device. In one embodiment, the bearing element 794 is formed by a sheet metal element, which is fixedly connected to the fastening element 740 and forms a lug having a cutout. In one particular embodiment, the bearing element 794 is welded to the fastening element 740. The bearing pin engages in the cutout of the bearing element 794 formed by the tab.

The guard anti-twist device 712 comprises a further bearing unit 716, which is configured to support the braking element 714, in a braking state, movably relative to the basic element 710. The bearing unit 716 comprises a further bearing pin 755, which extends perpendicularly to the radial direction 18 and tangentially to the fastening element 740. The further bearing pin 755 is connected to the lever element 750 and is movably mounted. A screwing element (not represented in detail) is movably connected by a screw connection to the bearing unit 716 and to the braking element 714. The bearing pin 755 is rotatably connected to the braking element 714 and extends through a cutout 796 of the braking element 714. The bearing unit 716 is configured to support the braking element 714 tiltably about an axis which extends perpendicularly to the radial direction 18 and tangentially to the fastening element 740. The lever element 750 may be pivoted to pivot the braking element 714 in engagement with a collar of a power tool so that the braking element applies a frictional braking force against the collar when the power tool is in an operating state.

Figure 8:
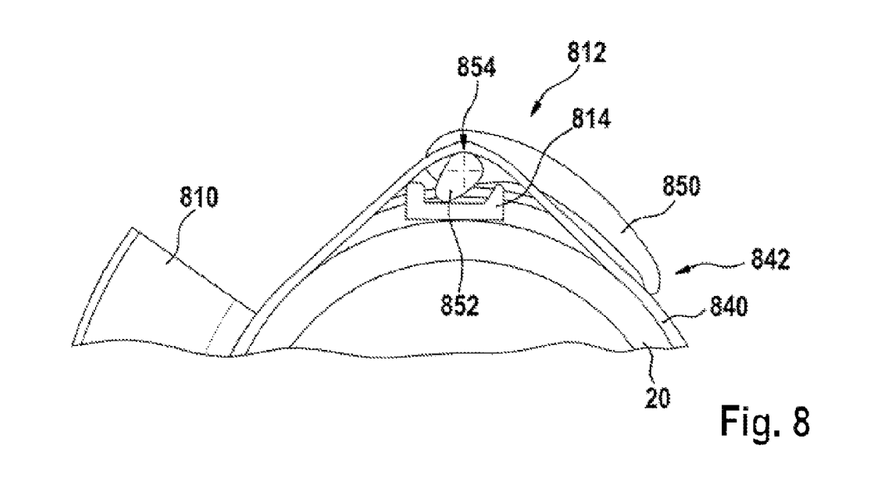
FIG. 8 shows a detail of an alternative guard device having a guard anti-twist device in a schematic representation.

In FIG. 8, a detail of an alternative guard device is represented. The alternative guard device corresponds in large part to the guard device already described and is configured for coupling to the portable power tool already described. The alternative guard device comprises a fastening element 840 that defines a central opening configured to receive the collar of the portable power tool, a basic element 810 extending from the fastening element and configured to enclose the insert tool when the guard device is connected to the tool holder of the power tool, and a guard anti-twist device 812. The guard anti-twist device 812 has a braking element 814 configured to engage the collar 20 of the power tool and corresponding to the braking element 114 already described, which, in an operating state of the portable power tool, is configured for frictional anti-twist locking of the basic element 810 relative to the portable power tool. The guard anti-twist device 812 additionally has an actuating unit 842, which is configured for displacement of the braking element 814.

In the embodiment shown, the actuating unit 842 comprises a lever element 850. The guard anti-twist device 812 includes an eccentric 852, which is connected in a rotationally secure manner to the lever element 850. The lever element 850 is supported by a bearing unit 854 pivotably relative to the fastening element 840. In the embodiment shown, the braking element 814 is of cup-shaped configuration. The eccentric 852 contacts the braking element 814. By pivoting of the lever element 850, the braking element 814 is displaced by means of the eccentric 852 inward in a radial direction and is pressed against the collar 20. A braking force formed by a friction force is thereby generated when the power tool is in an operating state.

Figure 9A:
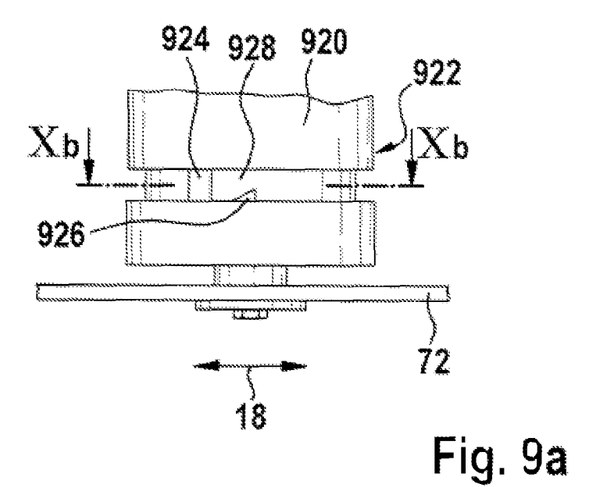
FIG. 9a shows a detail of the portable power tool in the region of a collar in a schematic, perspective representation.
Figure 9B:
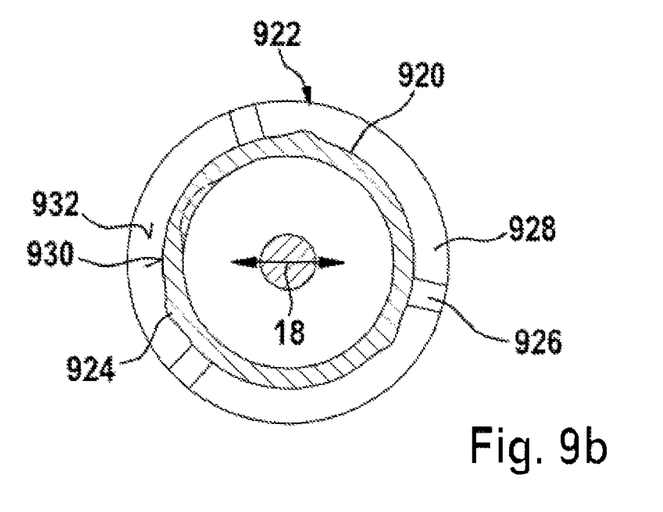
FIG. 9b shows the collar of the portable power tool in a schematic sectional representation.

In FIGS. 9a and 9b, a detail of an alternative collar 920 of the portable power tool already described is represented in greater detail. The alternative collar 920 corresponds in large part to the collar 20 already described. The collar 920 has on an outer peripheral surface a braking region 922. In the braking region 922 of the collar 920 is disposed a braking groove 928. The braking groove 928 extends from the outer peripheral surface of the collar 920 inward in the radial direction 18. The braking region 922 of the collar 920 has a tilting element. The braking region 922 of the collar 920 has a plurality of tilting elements 924, 926, which are evenly distributed in the peripheral direction 74.

The braking region 922 of the collar 920 has different tilting elements 924, 926. The tilting elements 924, 926 are configured to, in a braking state, correspond with the braking element already described (not represented here) of the guard device in a fitted state. The first tilting element 924 is disposed on a groove bottom 930 of the braking groove 928 and extends in the radial direction 18 outward from the groove bottom 930 of the braking groove 928. The further tilting element 926 is disposed on a groove wall 932 of the braking groove 928 and extends perpendicularly to the radial direction 18 from the groove wall 930 of the braking groove 928 into the braking groove 928. Alternatively or additionally, it is also conceivable for the groove bottom 930 and/or the groove wall 932 to have as the tilting element a depression (not represented), into which the braking element in a braking state tips, and/or a predetermined breaking point (shown in dashed representation) (FIG. 9b), into which the braking element in a braking state breaks, is thereby tilted, so that a frictional engagement or an entrenchment of the braking element in the braking groove 928 can be reinforced.

In a braking situation in which the guard device twists relative to the portable power tool, the braking element brushes over at least one of the tilting elements 924, 926 of the braking groove 928 and leads to a tilting of the braking element, whereby the braking element digs into the braking groove and a friction force is increased sufficiently far to brake or halt the twisting of the guard device relative to the portable power tool. It is conceivable to provide in the braking groove 928 just a single tilting element 924, 926, or only similar tilting elements 924, 926, or a plurality of different tilting elements 924, 926.

What is claimed is:

1. A guard device for a power tool, comprising:
   a fastening element defining a central opening through which a collar of the power tool is extended, the fastening element being configured to be fastened onto the collar;
   a lever element pivotably supported on the fastening element for pivotal movement about a first axis that is perpendicular to a radial direction;
   a guard portion extending from the fastening element and configured to surround at least a portion of a tool holder extending from the collar of the power tool when the collar is extended through the central opening of the fastening element; and a braking element pivotably supported on the fastening element and including a frictional engagement surface that is configured to be pressed against the collar by the pivotal movement of the lever so as to apply a frictional braking force against the collar when the power tool is in an operating state, the braking element being tiltable about a second axis tangent to the fastening element during a braking state; and wherein the frictional engagement surface is configured to increase the braking force applied to the collar in response to a braking state of the power tool.

2. The guard device according to claim 1, further comprising:

a bearing unit configured to guide tiltable movement of the braking element about the second axis during the braking state so that the braking force applied by the frictional engagement surface is increased.

3. The guard device of claim 2, wherein the bearing unit is incorporated into the fastening element.

4. The guard device of claim 3, wherein the bearing unit is configured to tiltably support the braking element such that none or a limited portion of the frictional engagement surface of the breaking unit is positioned in contact with the collar during an operating state of the power tool.

5. The guard device of claim 4, wherein the bearing unit supports the breaking element such that the braking state of the power tool causes the breaking element to tilt which in turn causes a greater portion of the frictional engagement surface of the breaking element to move into contact with the collar.

6. The guard device of claim 1, further comprising:

an eccentric operably coupled to the lever and configured to be pivoted about the first axis to press the braking element towards the collar so as to apply a frictional braking force against the collar when the power tool is in an operating state.

7. A guard device for a power tool, comprising:

a fastening element defining a central opening through which a collar of the power tool is extended, the fastening element being configured to be fastened onto the collar;

a lever element pivotably supported on the fastening element for pivotal movement about an axis that is perpendicular to a radial direction;

a guard portion extending from the fastening element and configured to surround at least a portion of a tool holder extending from the collar of the power tool when the collar is extended through the central opening of the fastening element; and an eccentric pivotably supported on the fastening element and including a frictional engagement surface that is configured to be pressed against the collar by the pivotal movement of the lever so as to apply a frictional braking force against the collar when the power tool is in an operating state, wherein the frictional engagement surface is configured to increase the braking force applied to the collar in response to a braking state of the power tool.

8. The guard device of claim 7, wherein the eccentric is configured to be pivoted in direct engagement with the collar so as to apply a frictional braking force against the collar when the power tool is in an operating state.

9. The guard device of claim 7, further comprising a bearing unit fixedly secured to the fastening element and configured to pivotably support the lever.

10. The guard device of claim 9, wherein the eccentric is fixedly secured to the lever.

11. The guard device of claim 10, wherein the eccentric is formed integrally with the lever.

12. The guard device of claim 7, wherein the eccentric is configured to be pivoted in direct engagement with the collar so as to apply a frictional braking force against the collar when the power tool is in an operating state.

* * * * *